United States Patent
Davidson et al.

[19]

[11] Patent Number: 5,560,642
[45] Date of Patent: Oct. 1, 1996

[54] DRIVER AIR BAG MODULE ASSEMBLY

[75] Inventors: Phillip K. Davidson, Howell; Brian T. Seymour, Royal Oak, both of Mich.

[73] Assignee: Takata, Inc., Auburn Hills, Mich.

[21] Appl. No.: 369,508

[22] Filed: Jan. 6, 1995

[51] Int. Cl.⁶ ................................................. B60R 21/16
[52] U.S. Cl. ........................................ 280/728.2; 280/731
[58] Field of Search .................................. 280/728.2, 731

[56]         References Cited

U.S. PATENT DOCUMENTS

| | | | |
|---|---|---|---|
| 4,183,550 | 1/1980 | Sudou | 280/731 |
| 5,022,676 | 6/1991 | Rogerson et al. | 280/743.1 |
| 5,064,218 | 11/1991 | Hartmeyer | 280/731 |
| 5,087,069 | 2/1992 | Corbett et al. | 280/731 |
| 5,176,400 | 1/1993 | McGuire et al. | 280/728.2 |
| 5,207,544 | 5/1993 | Yamamoto et al. | 280/728.2 |
| 5,333,897 | 8/1994 | Landis et al. | 280/731 |
| 5,344,182 | 9/1994 | Lauritzen et al. | 280/728.2 |
| 5,350,190 | 9/1994 | Szigethy | 280/731 |
| 5,380,037 | 1/1995 | Worrell et al. | 280/731 |
| 5,409,256 | 4/1995 | Gordon et al. | 280/731 |

OTHER PUBLICATIONS

*Development of a New Downsized Airbag System for use in Passenger Vehicles*, James P. Karlow, J. John Jakovski, Brian Seymour, 1994 SAE International Congress & Exposition.

*Primary Examiner*—Kenneth R. Rice
*Attorney, Agent, or Firm*—Harness, Dickey & Pierce, PLC

[57]         ABSTRACT

An improved construction and assembly process for a driver's-side air bag module is provided which incorporates an integral inflator and air cushion clamp ring, and which is readily snap-fit attached to a vehicle steering wheel hub. The ring/inflator assembly is received inside an air bag, extends partially through the air bag mounting opening, and mates preferably with ball-lock fasteners to a module base plate to trap the air bag to the module. The fasteners also allow easy attachment of the assembled air bag module to the hub of a vehicle steering wheel.

7 Claims, 2 Drawing Sheets

DRIVER AIR BAG MODULE ASSEMBLY

FIELD OF THE INVENTION

This invention relates to inflatable motor vehicle occupant restraint systems, and more particularly to an improved snap-fit mounting and process of assembly which provides ease of assembly and disassembly of an air bag module assembly for mounting to a hub base of a vehicle steering wheel.

BACKGROUND OF THE INVENTION

Inflatable restraint systems configured for use as passive occupant restraint devices are now commonly utilized for impact protection. Modular driver air bag restraint systems are mounted on vehicle steering wheels which inflate during a collision in response to an electrical signal generated from one or more crash sensors mounted to the motor vehicle. The inflated air bag provides energy absorption for an occupant during a vehicle frontal crash. Additionally, the air bag improves the contact surface for the occupant with the vehicle interior during a frontal crash.

Currently, driver's-side air bag module assemblies utilize a cushion clamp ring equipped with a plurality of threaded studs to retain an air bag to the front face of a module base plate. An inflator is mounted to the back face of the base plate and extends through a central opening in the base plate so as to provide a passageway through which inflation gases are delivered to inflate the air bag during deployment. To assemble the module, the clamp ring is inserted inside the air bag cushion through the mounting opening, and the ring is seated about the inflator mounting opening so that the studs protrude through fastener apertures formed about the opening. The clamp ring studs extend outwardly from the air bag, and are used to attach the air bag to the module baseplate and the inflator. Typically, the ring, air bag, base plate, and inflator are bolted together by affixing a nut to the end of each stud. However, this technique requires the use of a large number of separate parts to construct the air bag module, thereby complicating its assembly.

Presently, a driver's-side module is mounted to a motor vehicle steering wheel hub with a plurality of fasteners. One variation utilizes a plurality of hollow and internally threaded studs which extend downwardly from the back of a module base plate, and which align with openings in the hub mounting plate of a steering wheel. Threaded fasteners are rearwardly inserted through the openings in the hub mounting plate and threaded into the studs on the module base plate. By tightening the fasteners, the air bag module is securely retained to the steering wheel hub. However, with this version it is necessary to individually thread all of the fasteners into a corresponding threaded stud in order to secure the module to the steering wheel hub. Likewise, all of the fasteners must be individually unthreaded in order to remove the air bag module from the steering wheel hub. Furthermore, the air bag must be separately retained to the base plate with a hub ring and dedicated fasteners.

In another version, a driver's side air bag module is retained to a vehicle steering column with spring clips. A plurality of tubular members downwardly extend from the hub portion of a steering wheel. A plurality of complementary mating cylindrical members likewise extend downwardly from the back of the module base plate for axial insertion into the tubular members in the hub. Aligned chordal or transverse slots are further provided in an aligned and interfitting manner in both the tubular and cylindrical members such that when assembled, the spring leg of a securement which is inserted into the respective slots releasably secures the cylindrical member against axial withdrawal from the cylindrical member. The securement mounts to the coaxial member as a result of the spring leg being biased into engagement with both members. To remove the air bag module from a steering wheel hub, a key is inserted into the bottom of the axial member which biases apart the spring leg to release the cylindrical member from within the axial member. However, with this design the air bag is still mounted to the base plate with a separate fastener ring and dedicated fasteners. Therefore, there is presently a need to reduce the number of parts necessary to construct a snap-fit driver's air bag module.

SUMMARY OF THE INVENTION

Pursuant to this invention, an improved construction and process of assembly is provided for a driver air bag module assembly particularly suited for use in a steering column mounted front impact air bag module. Namely, an integrally formed cushion ring receives fasteners which are used to quickly connect and disconnect a driver's air bag module to the hub of a vehicle steering wheel. Preferably, an inflator flange is integrally formed by the inflator such that the inflator and flange are inserted as a unit into the mounting opening of the air bag during assembly. A plurality of "ball lock" style fasteners carried by the ring which also extend from the ring are inserted through fastener apertures in the air bag about the mounting opening to protrude outwardly of the air bag. The ball lock fasteners are then inserted through mounting openings in the base plate which retain the inflator, air bag, and base plate together as a complete sub assembly prior to assembly with a steering wheel hub base. Preferably, the ball locks also receive conical springs before they are assembled to corresponding apertures in a steering wheel hub base, such that the ball lock fasteners retain the assembled module to a vehicle steering wheel. The springs serve to bias apart the assembled module and the hub base to prevent an looseness during use which could create noise and vibration problems. Furthermore, the springs retain the balls of each ball lock fastener in a radially inwardly biased, or locked position which facilitates assembly of the air bag module to a steering wheel hub without the use of tools.

Objects, features and advantages of this invention are to provide a snap-fit driver-side air bag module for use on a vehicle steering wheel which is substantially constructed from relatively fewer parts than present modules, which can be mated and demated from a vehicle steering wheel with a simple tool, and which retains an air bag to a base plate and inflator with relatively few parts. The resulting air bag module is quickly and easily assembled from a reduced number of parts which substantially reduces assembly complexity to provide a geometry well suited for driver air bag module use, and is rugged, durable and of economical manufacture and assembly.

Further objects, features and advantages of the invention will become apparent from a consideration of the following description and the appended claims when taken in connection with the accompanying drawings.

DETAILED DESCRIPTION OF THE PREFERRED EMBODIMENT

For applications where it is desirable to snap-fit a complete driver air bag module assembly to a complementary steering wheel hub base, an improved module assembly is provided which securely retains an air bag to a module and also secures the module to a steering wheel with a reduced number of parts.

Figure 1:
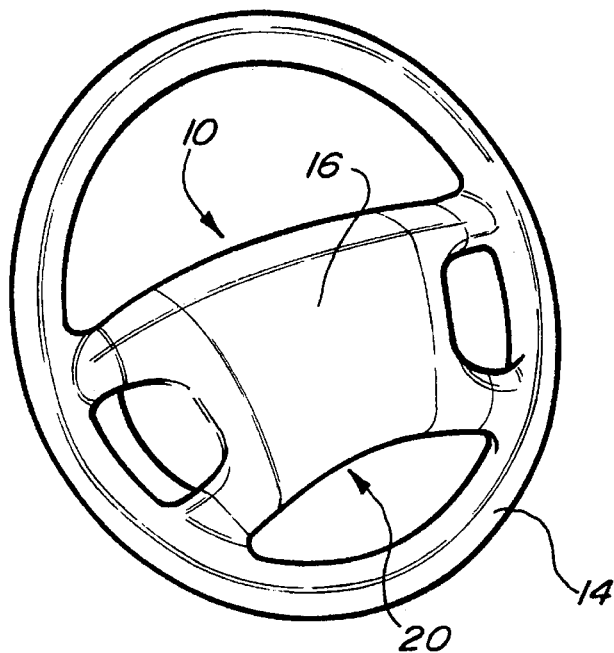
FIG. 1 is a perspective view of a driver air bag module assembly of the present invention assembled to a vehicle steering wheel.

A driver's-side frontal air bag module of this invention is shown in an assembled state in FIG. 1 and is designated there by reference numeral 10. As shown, module 10 houses an air bag 12 beneath a cover 16 which is affixed to a vehicle steering wheel 14 by affixing a base plate 18 of the module to a hub 20 on the steering wheel. Preferably, the contour of the cover 16 blends the cover into the surrounding surfaces of the vehicle steering wheel 14 to make the air bag module aesthetically inconspicuous with respect to the steering wheel.

Figure 2:
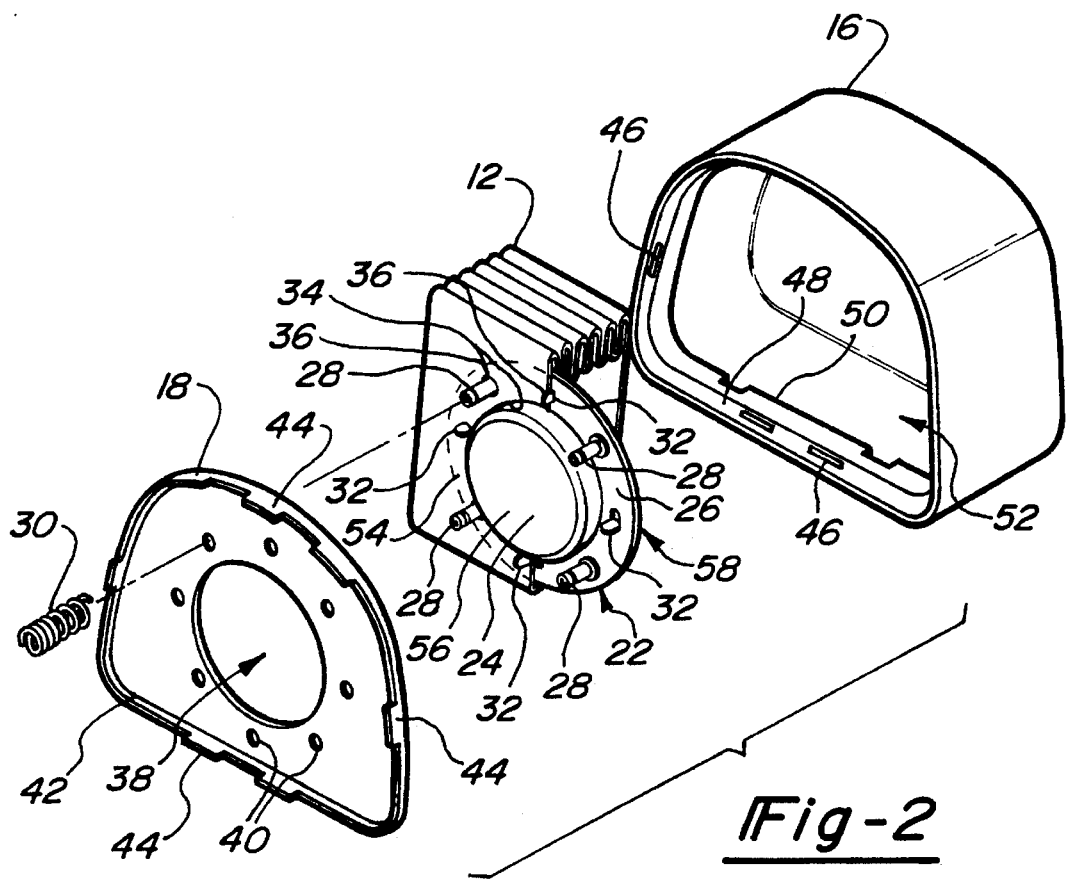
FIG. 2 is an exploded schematic perspective view of the driver air bag module assembly of FIG. 1.

As shown in FIG. 2, an inflator assembly, or retention ring/inflator assembly 22 is used to mount the air bag 12 to the base plate 18. The assembly 22 comprises an inflator 24 with an integrally formed cushion clamp ring 26. Preferably, the clamp ring 26 is a flange integrally formed during the construction of the inflator 24. A plurality of ball-lock style fasteners 28 are rigidly retained to the ring 26 by inserting a cylindrical collar on the back face of each fastener head into each aperture 29 afterwhich the collar is deformed with a tool to rivet the fastener to the ring 26. As a result, four fasteners are provided circumferentially spaced apart about the ring 26 to which they are rigidly retained. Alternatively, the fasteners can have a broad flush head for insertion into respective apertures 29 where the fastener is either press-fit or spot welded to the ring. By inserting the assembly 22 and accompanying fasteners 28 inside the air bag so that the fastener ends protrude outwardly of the air bag, the fastener ends are presented for through engagement with respective openings 40 in the base plate.

A tool having four aligned pins is used to concurrently release, or unlock each of the ball lock style fasteners during assembly to the base plate. By mounting the base plate 18 on the tool such that the pins extend through apertures 40, each of the four ball locks is unlocked, allowing mating of the ball locks through the openings 40, and mounting of the assembly 22 and air bag 12 to the base plate 18. Preferably, coil springs 30 are also preassembled onto the pins of the tool such that the springs 30 are passed onto the end of each ball lock 28 after the base plate is affixed to the assembly 22. As a result, the springs 30 retain each of the ball locks in an unlocked, or cocked position until the springs are compressibly biased toward the assembly 22 as assembled module 10 is mated with holes in a steering column hub 20 which locks the ball lock fasteners. As a result, the cushion is trapped between the inflator flange, or clamp ring 26 and the base plate 18 in a final assembled condition. The cushion 12 is then folded and the cover 16 is snapped to the base plate 18 to provide a completely assembled driver air bag module capable of being later snap-fit attached as a complete assembly to the driver steering wheel via the ball lock type fasteners extending from the final assembly. A plurality of complementary apertures (not shown) are provided in the steering wheel hub 20 through which the ends of each ball-lock fastener extend and interlock. Insertion of each ball lock fastener 28 through each opening 40 causes each spring 30 to axially compress towards assembly 22 which releases the balls radially outwardly within each fastener, thereby locking the balls in a radially outward position to secure each fastener to the corresponding mounting holes in the hub 20.

Figure 3:
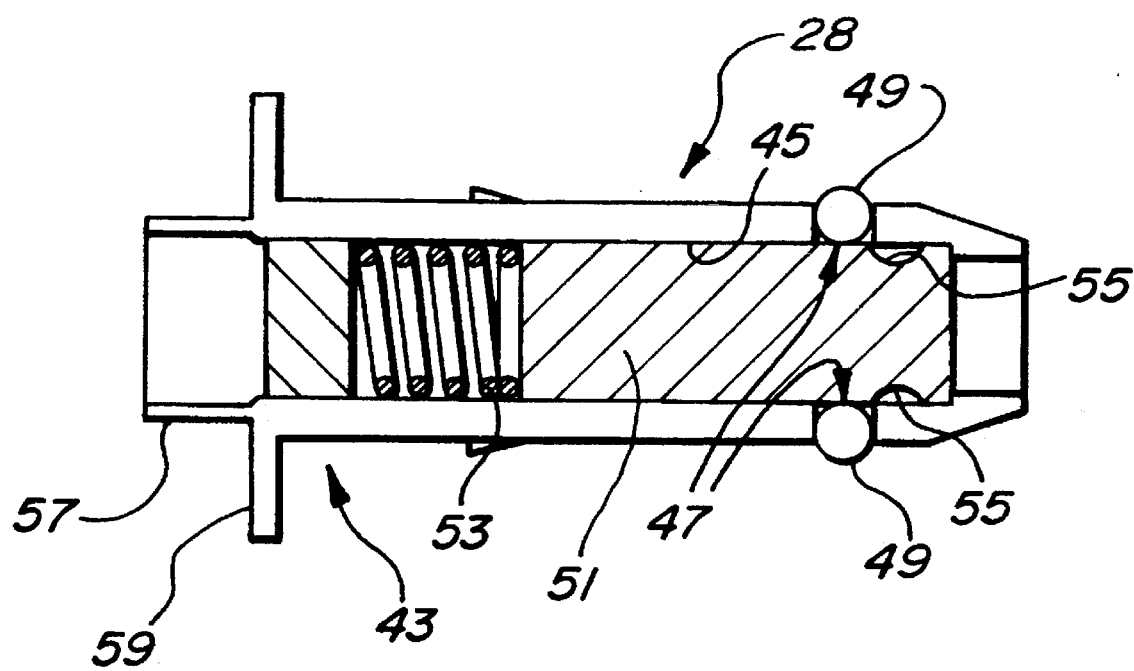
FIG. 3 is a centerline sectional view of a ball lock style fastener utilized with the driver air bag module assembly of FIGS. 1 and 2.

The ball-lock fasteners 28 are preferably constructed from one of several presently commonly available configurations. Generally, as shown in FIG. 3 ball-lock fasteners comprise a headed shank 43 having a central through-bore 45. An end of the shank opposite the head has a pair of radially opposite passageways 47 which radially outwardly extend from the central through-bore. Preferably, the passageways are formed with a constant diameter bore and receive a similarly sized ball bearing. After inserting each ball bearing into each passageway, the outer edge of each passageway is locally crimped which traps the ball at its widest diameter such that the passageway will still allow the radial outermost surface of the ball to extend beyond the outer surface of the fastener shank. Subsequently, a push rod 51 is inserted into the central through-bore, which traps the balls in a radially outward position such that their radial outermost feature extends beyond the radial outer surface of the shank. The pin is axially retained in this position by a biasing spring 53. However, an adjacent region of the pin has a radially inward extending circumferential groove 55 which allows the balls to be radially inwardly displaced by axially displacing the rod against the spring to center the groove beneath the pair of balls. During assembly of the module 10, the rod is axially displaced with a tool during insertion of the fastener to the baseplate with a closely sized receiving hole 40 through which it is fastened. The headed portion of shank 43 is formed by a cylindrical retainer 57 which extends rearwardly of a head flange 59. Fasteners are assembled to ring 26 by inserting the cylindrical retainer 57 into aperture 29 of ring 26 until a head flange 59 seats against the ring. Subsequently, the remaining portion of the cylindrical retainer 57 which extends beyond the ring 26 is radially outwardly deformed with a tool to form mushroom-head, or riveted fastening of each fastener 28 to the ring 26.

As shown in FIG. 2, cover 16 and base plate 18 are constructed for complementary snap-fit engagement in order to provide an assembly which contains the air bag 12. The overall construction of such a snap-fit cover and base plate is disclosed in co-pending U.S. patent application, Ser. # 08/294,111 for a Snap-Fit Module Cover, filed Aug. 22, 1994 which is hereafter incorporated by reference. Although configured slightly differently, applicant's present device comprises the base plate 18 having a turned down edge 42 which integrally forms a plurality of fingers, or tabs 44 which interlock in assembly with cover slots 46 formed in the cover 16 which extend through an inner lip edge 48 adjacent a folded back lip 50. The base plate 18 has an inflator clearance opening 38 through which the diffuser-portion of the inflator 24 extends in final assembly. A plurality of through-apertures are formed in a central portion of the base plate, preferably circumferentially spaced about opening 38.

Preferably, the air bag 12 is sewn together from one or more panels of flexible membrane material to form a confinement chamber 52 for receiving inflation gases from the air bag inflator 24 during deployment. A mounting opening 34 is formed preferably in a locally reinforced region of the air bag through which the inflator/ring assembly 22 is inserted during assembly. Preferably, a circumferential reinforcing patch 54 is sewn about the opening to form a suitable reinforcement where the air bag is attached to the module. Likewise, a plurality of air bag fastener apertures 36 are formed circumferentially about the mounting opening through which either a fastener 28 or a tab 32 on assembly 22 extend in the final assembled state.

Preferably, the ring/inflator assembly is constructed from a welded-together two-piece assembly similar to constructions presently used to form air bag inflators. Namely, a diffuser 56 is welded to a base 58 to form the exterior shell for the inflator 24 as is commonly done when forming a traditional air bag inflator. The diffuser 56 is constructed from a sheet metal stamping that is centrally drawn out into the shape of a cylindrical pot which forms substantially all of the internal volume of the assembled inflator 24. Likewise, the base is formed from a sheet metal stamping, having a shallow drawn out portion which fits over the cylindrical open end of the diffuser to which it is affixed. Preferably, the base is circumferentially welded to the diffuser by laser or electron beam welding. Alternatively, the pair can be friction welded together. However, the base 58 on applicant's inflator preferably extends radially outwardly of the diffuser to form the ring 26. Hence, base 58 essentially comprises a cylindrical disc having a shallow centrally drawn-out portion which fits over the end edge of the diffuser 56.

Alternatively, the cushion clamp ring 26 can be formed from the diffuser 56 by radially outwardly turning the end edge of the diffuser and inserting the base which has an inwardly turned end edge inside the drawn out portion of the diffuser. As was the case for the preferred embodiment discussed above, the assembled diffuser and base can then be welded together. Furthermore, the ring 26 can be constructed from a separate piece of sheet metal which is affixed to the exterior of an inflator.

Preferably, the ring apertures 29 and bend tabs 32 are formed in the ring portion of base 58 in a single stamping operation. Preferably, the base 58 is first stamped in order to draw out the central portion. Subsequently, a second stamping operation concurrently forms the apertures 29 and tabs 32 in a single step. Thereafter, the diffuser and base are welded together, trapping an inflator squib, propellant, and screen within the ring/inflator assembly. Finally, the fasteners are press fit into the apertures 29 in a single operation. Additionally, diffuser apertures (not shown) are provided in the base 58 through which inflation gases are delivered to the air bag 12 during deployment.

It is envisioned that a number of alternative fasteners can be substituted for the ball-lock style fasteners shown in FIGS. 1 and 2. Namely, one suitable substitute is a headed shank having a groove opposite the head for receiving a spring clip. The headed shank can be welded or press fit into apertures 29. The snap rings can be clipped onto the shank after assembling the module 10, but before mounting the module to a vehicle steering wheel 14. When it comes time to mount the module, the snap rings are removed, the module is inserted into corresponding holes in the steering wheel hub, and the rings are snapped onto the ends of each respective stud which extend through the back face of the hub. Alternatively, a headed shank having a threaded end to which a complementarily threaded nut is affixed can be utilized. In the case of the threaded shank fastener, there is no need for springs 30.

Similarly, it is envisioned that the air bag module assembly of this invention can be incorporated into the design of various other deployment configurations within a vehicle. For example, side impact air bag modules which are constructed with similar features to a driver's side air bag module, and incorporate a similar inflator and base plate construction can incorporate the improvements of this invention.

It is to be understood that the invention is not limited to the exact construction illustrated and described above, but that various changes and modifications may be made without departing from the spirit and scope of the invention as defined in the following claims.

I claim:

1. An air bag occupant restraint system module for use in a motor vehicle, comprising:

an air bag formed from a flexible membrane having an inflation chamber, a mounting opening, and a plurality of apertures provided about the mounting opening;

a base plate having a central portion including a plurality of apertures and an inflation opening and an outer periphery;

a cover constructed and arranged for mounting to said base plate and cooperating with said base plate when assembled to encase said air bag; and an inflator assembly including a gas generating inflator, a retention ring carried by the inflator, and a plurality of elongated fasteners mounted to the retention ring and extending therefrom in a circumferentially spaced apart relation;

a portion of said inflator assembly including said retention ring being disposed within said air bag and arranged such that each of the fasteners protrude outwardly of the air bag through a complementary one of the air bag apertures, and subsequently through a corresponding complementary one of the base plate apertures trapping said air bag about the mounting opening between said base plate and retention ring and attaching the inflator assembly to the base plate, said elongated fasteners extending from the base plate to present fastener end portions for fastening the air bag module to corresponding complementary apertures provided in support structure of the vehicle whereby the elongated fasteners both attach the inflator assembly to the base plate and attach the air bag module to a vehicle support structure.

2. The air bag module of claim 1 wherein said fasteners are ball-lock type fasteners.

3. The air bag module of claim 1 wherein said fasteners are press fit into the base plate apertures.

4. The air bag module of claim 1 wherein said fasteners are received into the base plate apertures and welded.

5. The air bag module of claim 1 which further comprises a spring constructed and arranged for snap-fit engagement over said fastener end portions of said fasteners following extension of the fasteners through the base plate apertures, wherein said spring biases apart the air bag module and the support structure of the vehicle when in an assembled state.

6. The air bag module of claim 1 wherein said cover snap-fits to said base plate about the base plate outer periphery.

7. The air bag module of claim 1 wherein the air bag module is a driver's-side air bag module which in an assembled state is fixed to apertures in a steering wheel hub via the plurality of fasteners.

* * * * *